March 2, 1965   A. L. LUDWIG   3,171,683
WINDSHIELD ASSEMBLY FOR MOTOR VEHICLES AND THE LIKE
Filed July 18, 1963
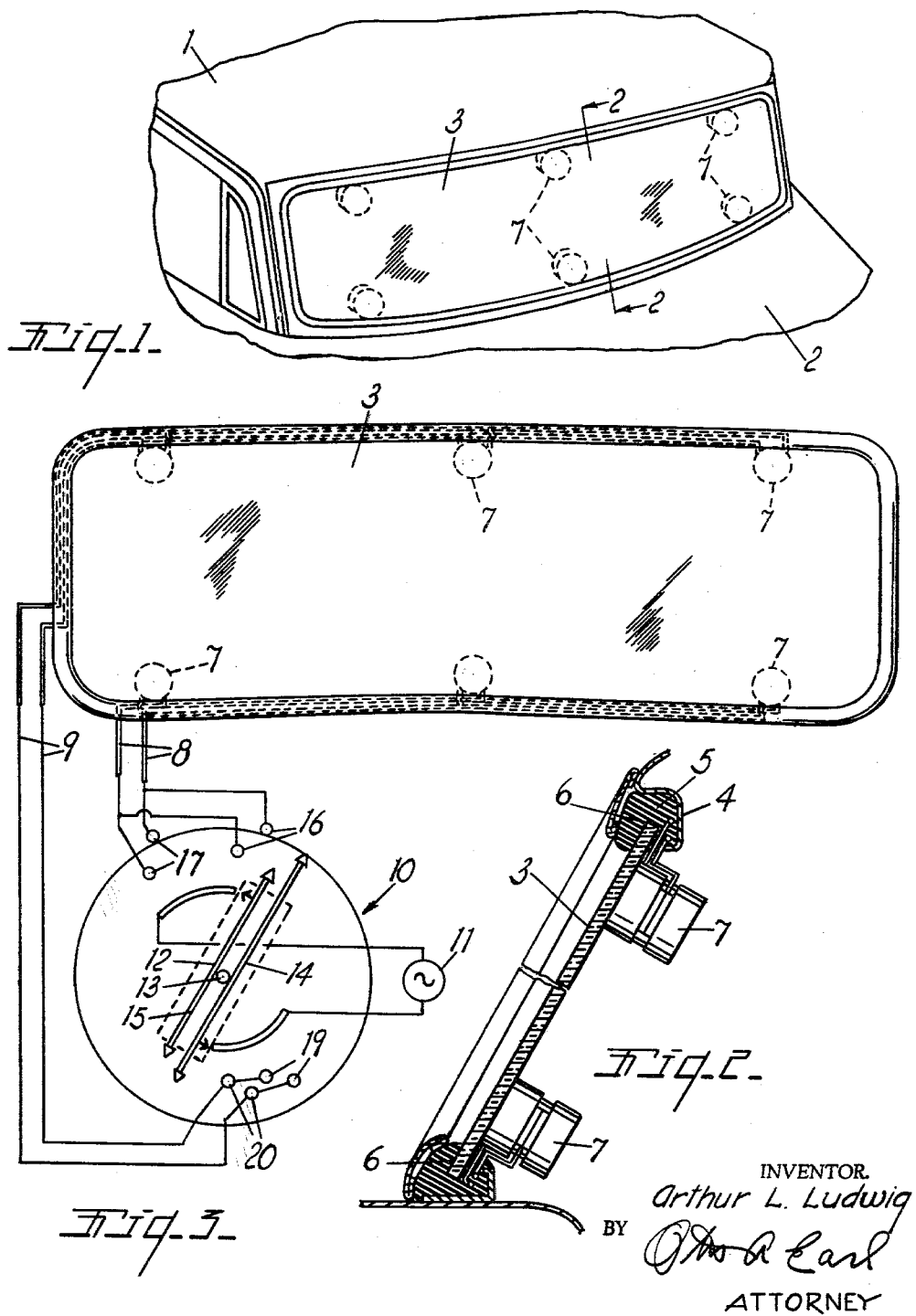
INVENTOR.
Arthur L. Ludwig
BY
ATTORNEY

United States Patent Office 3,171,683
Patented Mar. 2, 1965

3,171,683
WINDSHIELD ASSEMBLY FOR MOTOR VEHICLES AND THE LIKE
Arthur L. Ludwig, Hastings, Mich., assignor to Hastings Manufacturing Company, Hastings, Mich.
Filed July 18, 1963, Ser. No. 296,028
16 Claims. (Cl. 296—84)

This invention relates to a windshield structure including means for removing water therefrom without the use of wiper blades or the like. The main objects of this invention are:

First, to provide a windshield assembly including means for removing water therefrom without the use of wiper blades or the like.

Second, to provide a windshield assembly in which the windshield panel or glass is supported to permit and is subjected to high frequency vibration so that water, snow and other material landing thereon is discharged therefrom.

Third, to provide a structure or assembly having these advantages in which the apparatus is switch controlled.

Objects relating to details and economies of the invention will appear from the description to follow. The invention is defined and pointed out in the claims. A preferred embodiment of the invention is illustrated in the accompanying drawing, in which:

FIG. 1 is a fragmentary perspective view mainly conventionalized of an embodiment of my invention in an automobile top or automobile body.

FIG. 2 is an enlarged fragmentary view on a line corresponding to line 2—2 of FIG. 1.

FIG. 3 is a fragmentary view in which the parts are shown mainly conventionally embodying my invention.

In the accompanying drawings I have illustrated an adaptation or an embodiment of my invention largely in conventional form, the primary reason for that being that my invention is adapted for embodiment or incorporation in widely varying forms of windshields, such for example as used in motor vehicles or planes and the like.

In the accompanying drawing the numeral 1 represents an automobile body, broadly considered, and 2 the engine hood.

The automobile body is provided with a transparent windshield panel 3 which may be variously shaped to correspond to the vehicle's body structure. It is shown conventionally so far as shape is concerned.

The vehicle body 1 is provided with a windshield supporting frame 4 of inwardly facing channel section and completely surrounding the windshield panel 3. The windshield panel support 5 is formed of rubber or a like springably resilient material and is fittingly supported in the frame 4 and is provided with an inwardly facing groove 6 in which the top, bottom and end edges of the windshield panel 3 are supportedly engaged and are supported in substantially spaced relation to the windshield frame; see FIG. 2. Applicant has not, in this figure, attempted to show any curvature of the frame as may be present in a commercial embodiment. It will be understood that the shapes of the windshield panels vary greatly and therefore it is not attempted to show the shape or curvature in this FIG. 2. It should be understood, however, that the windshield is supported at its edges entirely by the springably resilient panel support 5 which permits vibration of the windshield at high frequency.

In the embodiment of my invention illustrated, there are six of these electro mechanical transducers 7, three mounted on the windshield adjacent the top and three adjacent the bottom, these being desirably uniformly spaced as is illustrated by dotted lines in FIGS. 1 and 3. I have not illustrated or described structural details of the transducers as they are of a well known and commercially avialable type such as are described in the book "Ultrasonics" by B. Carlin, published by McGraw-Hill Book Company, particularly in chapter 2, page 38. Transducers such as described in Patent No. 2,714,672 to Rich are also contemplated as possible forms of the transducers illustrated conventionally at 7 herein. The lower transducers are connected by the circuit wires 8 while the upper transducers are connected by the circuit wires 9. A switch control unit designated generally by the numeral 10 is conventionally illustrated in FIG. 3. The numeral 11 represents a current supply which in practice would desirably be a generator drivingly connected to the vehicle motor. The switch 10, as stated, is conventionalized and is provided with a manually adjustable switch element 12 pivotally mounted at 13 and provided with switch members 14 and 15 disposed in parallel relation. This switch unit is provided with a pair of contacts 16 and a pair of contacts 17, both being connected to the circuit member 8. The switch unit is also provided with a pair of contacts 19 and a pair of contacts 20 to which the wiring 9 is connected. With this arrangement the control switch may be adjusted to connect either the top or the bottom series of vibrating units to the source of electrical supply or it may be adjusted to connect both the top and bottom vibrating units at the same time.

Under certain weather conditions, it is found desirable to connect the upper series of vibrator units; under other conditions the lower series, and under certain other conditions both series.

It will be noted that the insulating panel supports not only permit high frequency vibration of the windshield but constitute insulating material for the current conductors and they are not subjected to vibration stresses and that also applies to the portions thereof connected to the vibration producing units 7. As stated, certain of the parts are illustrated conventionally in the accompanying drawing, and my invention may be readily adapted or embodied in or incorporated in windshields and the like of widely varying shapes and sizes.

I have illustrated and described my invention in a highly practical embodiment thereof. I have not attempted to illustrate or describe other adaptations or embodiments which I contemplate, as I believe this disclosure will enable those skilled in the art to embody or adapt my invention as may be desired.

Having thus described the invention, what is claimed as new and desired to secure by Letters Patent is:

1. In combination with a vehicle body, of a transparent windshield panel, supporting means for said panel including a frame of inwardly facing channel section supportedly mounted on said vehicle body, a springably resilient panel support disposed in said frame and having an inwardly facing groove therein in which the edges of said panel are surroundingly and supportedly disposed in substantially spaced relation to the frame, two sets of electrically actuated high frequency vibration producing units supportedly mounted on the inner side of said panel in laterally spaced relation, one set being disposed adjacent the upper edge and the other edge of said panel, two sets of current conductors having portions thereof imbeddingly disposed in said panel support, one of said sets of current conductors being operatively connected to the upper set and the other to the lower set of said vibration producing units, and switch means disposed to be operated by an occupant of the vehicle for connecting either the upper set or the lower set of vibration producing units, or both, to a current source.

2. In combination with a vehicle body, of a transparent windshield panel, supporting means for said panel including a frame supportedly mounted on said vehicle body, a springably resilient panel support disposed in said frame and having an inwardly facing groove therein in which the edges of said panel are surroundingly and supportedly disposed in substantially spaced relation to the frame, two sets of electrically actuated high frequency vibration producing units supportedly mounted on the inner side of said panel in laterally spaced relation, two sets of current conductors having portions thereof imbeddingly disposed in said panel support, one of said sets of current conductors being operatively connected to one set and the other to the other set of said vibration producing units, and switch means disposed to be operated by an occupant of the vehicle for connecting either set of vibration producing units, or both, to a current source.

3. In combination with a vehicle body, of a transparent windshield panel, supporting means for said panel including a frame supportedly mounted on said body, a springably resilient panel support supportedly mounted on said frame and having an inwardly facing groove therein in which the edges of said panel are surroundingly and supportedly disposed in spaced relation to the frame, sets of electrically actuated high frequency vibration producing units supportedly mounted on said panel in laterally spaced relation and adjacent the upper and lower edges thereof, current conductor units having portions thereof imbeddingly disposed in said panel support, one unit being operatively connected to one set of vibration producing units and the other to the other set, and a switch means for connecting either vibrating unit or both units to a current source.

4. In combination with a vehicle body, of a transparent windshield panel, supporting means for said panel including a frame supportedly mounted on said body, a springably resilient panel support supportedly mounted on said frame and with which the edges of said panel are supportedly engaged, sets of electrically actuated high frequency vibration producing units supportedly mounted on said panel in laterally spaced relation, current conductor units operatively connected to said vibration producing units, and a switch means for connecting either vibrating unit or both units to a current source.

5. In combination with a vehicle body, of a transparent windshield panel, supporting means for said panel including a frame of inwardly facing channel section supportedly mounted on the body, a springably resilient panel support disposed in said frame and in which the edges of said panel are imbeddingly supported in spaced relation to the frame, groups of transducers supportedly mounted on the said panel in laterally spaced relation to each other, current conductors for said groups of transducers, and switch means for connecting one group or all groups to a current source.

6. The combination of a transparent windshield panel, supporting means for said panel comprising a frame of inwardly facing channel section supportedly mounted on the body, a springably resilient panel support disposed in said frame in which the edges of said panel are imbeddingly supported in spaced relation to the frame, groups of transducers supportedly mounted on the said panel in laterally spaced relation to each other, current conductors for said groups of transducers, and switch means for connecting either group or both groups simultaneously to a current source.

7. The combination of a transparent windshield panel, supporting means therefor including a frame of inwardly facing channel section, a springably resilient panel support disposed in said frame and having an inwardly facing groove in which the edges of said panel are supportedly engaged in vibration absorbing relation to the frame, sets of electrically actuated high frequency vibration producing units supportedly mounted on said panel in laterally spaced relation, current conductors for said sets of vibration producing units having portions thereof imbeddingly disposed in said panel support, and switch means for selectively connecting the sets individually or collectively to a current source.

8. The combination of a transparent windshield panel, supporting means therefor including a frame of inwardly facing channel section, a springably resilient panel support disposed in said frame and having an inwardly facing groove in which the edges of said panel are supportedly engaged in vibration absorbing relation to the frame, sets of electrically actuated high frequency vibration producing units supportedly mounted on said panel in laterally spaced relation, current conductors for said sets of vibration producing units, and switch means for selectively connecting the sets individually or collectively to a current source.

9. The combination of a transparent windshield panel, a supporting frame therefor, a springably resilient support mounted on said frame and with which the edges of the panel are supportingly engaged in vibration absorbing relation to the frame, electrically actuated high frequency vibration units supportedly mounted on said panel, current conductors for said vibration producing units having portions thereof imbeddingly and concealingly disposed in said panel supports, and manually controlled switch means for connecting the vibration producing unit circuits to a current source.

10. The combination of a transparent windshield panel, a supporting frame therefor, a springbaly resilient support mounted on said frame and with which the edges of the panel are supportingly engaged in vibration absorbing relation to the frame, electrically actuated high frequency vibration units supportedly mounted on said panel, current conductors for said vibration producing units, and manually controlled switch means for connecting the vibration producing unit circuits to a current source.

11. The combination with a vehicle body, of a transparent windshield panel, supporting means for said panel comprising a frame, a springably resilient panel support, with which the edges of the panel are supportedly engaged, supportedly mounted on said frame, transducers supportedly mounted on said panel adjacent the edges thereof and in laterally spaced relation to each other, current conductors for said transducers connecting the same in groups, and switch means for controlling the current connections for the groups.

12. The combination with a vehicle body, of a transparent windshield panel, supporting means for said panel comprising a frame, a springably resilient panel support, with which the edges of the panel are supportedly engaged, supportedly mounted on said frame, transducers supportedly mounted on said panel in laterally spaced relation to each other, current conductors for said transducers connecting the same in groups, and switch means for controlling the current connections for the groups.

13. The combination of a transparent panel, a supporting frame therefor, a springably resilient support mounted on said frame and with which the edges of the panel are supportingly engaged in vibration absorbing relation to the frame, electrically actuated high frequency vibration units supportedly mounted on said panel, current conductors for said vibration producing units having portions thereof imbeddingly and concealingly disposed in said panel support, and switch means for connecting the vibration producing units conductors to a current source.

14. The combination of a transparent panel, a supporting frame therefor, a springably resilient support mounted on said frame and with which the edges of the panel are supportingly engaged in vibration absorbing relation to the frame, electrically actuated high frequency vibration units supportedly mounted on said panel, current conductors for said vibration producing units, and switch means for connecting the vibration producing units conductors to a current source.

15. The combination of a transparent panel, a supporting frame therefor, a springably resilient support mounted on said frame and with which the edges of the panel are supportingly engaged in vibration absorbing relation to the frame, an electrically actuated high frequency vibration unit supportedly mounted on said panel, a current conductor for said vibration producing unit, and a control switch for said conductor.

16. The combination with a vehicle body having a transparent window panel, supporting means for said panel comprising a frame and a springably resilient panel support mounted on said frame and with which the edges of the panel are supportedly engaged, a transducer supportedly mounted on said panel, a current conductor for said transducer, and a control switch for said conductor.

References Cited by the Examiner
UNITED STATES PATENTS 2,071,255 2/37 Dalley _____ 296—84 X
2,073,140 3/37 Buehn _____ 296—84

A. HARRY LEVY, *Primary Examiner.*